United States Patent [19]

Cheng

[11] Patent Number: 5,912,663
[45] Date of Patent: Jun. 15, 1999

[54] MONITOR ADJUSTMENTS MADE BY A SINGLE ROTATABLE AND DEPRESSIBLE KNOB WHICH INTERFACES WITH A MONITOR CONTROL DISPLAY MENU

[75] Inventor: Kuei-Pi Cheng, Taipei, Taiwan

[73] Assignee: MAG Technology, Co., Ltd., Taipei, Taiwan

[21] Appl. No.: 08/680,546

[22] Filed: Jul. 9, 1996

[51] Int. Cl.[6] .................................................. G09G 5/00
[52] U.S. Cl. .................................................... 345/184
[58] Field of Search ............................ 345/10, 11, 22, 345/112, 145, 146, 156, 157, 160, 902, 212, 184; 200/26, 36, 50.34, 61.46, 273; 341/35, 192

[56] References Cited

U.S. PATENT DOCUMENTS

| | | | |
|---|---|---|---|
| 4,794,388 | 12/1988 | Matthews | 345/184 |
| 4,975,689 | 12/1990 | Suzuki et al. | 345/184 |
| 5,270,689 | 12/1993 | Hermann | 345/145 |
| 5,270,821 | 12/1993 | Samuels | 345/156 |
| 5,386,220 | 1/1995 | Kubota | 345/184 |
| 5,440,325 | 8/1995 | Edmark, III | 345/184 |
| 5,448,697 | 9/1995 | Parks et al. | 345/156 |
| 5,457,473 | 10/1995 | Arai et al. | 345/10 |
| 5,532,719 | 7/1996 | Kikinis | 345/212 |
| 5,546,106 | 8/1996 | Walgers | 345/184 |
| 5,550,556 | 8/1996 | Wu et al. | 345/22 |
| 5,589,853 | 12/1996 | Fujiki | 345/156 |
| 5,602,567 | 2/1997 | Kanno | 345/507 |
| 5,703,661 | 12/1997 | Wu | 345/212 |

*Primary Examiner*—Jeffery Brier
*Assistant Examiner*—Paul A. Bell
*Attorney, Agent, or Firm*—Beveridge, DeGrandi, Weilacher & Young, LLP

[57] ABSTRACT

A monitor flywheel control for use in adjustment of the color monitor display includes a flywheel type bit generator to replace the conventional adjusting pushbuttons and knobs so that by use of a micro-controller technique, a single flywheel control knob which is both rotatable and depressible can be used to perform all the desired adjustment of the computer monitor display.

4 Claims, 3 Drawing Sheets

MONITOR ADJUSTMENTS MADE BY A SINGLE ROTATABLE AND DEPRESSIBLE KNOB WHICH INTERFACES WITH A MONITOR CONTROL DISPLAY MENU

FIELD OF THE INVENTION

The present invention relates generally to a monitor and in particular to a flywheel control for color monitors.

BACKGROUND OF THE INVENTION

With the development of computer software, there is a need of high display quality of monitors, especially color monitors. However, the cathode ray tubes (CRT) of the monitors have so far not been improved so significantly as to follow the development of the software. The monitors that are currently available in the market have problems in the adjustment and control of the display which are basically caused by the cathode ray tubes. In particular, the state-of-art cathode ray tubes usually generate errors with respect to geometry, convergency, focus and color purity. The larger the size of the monitor, the more severe these problems are.

Compensation means is usually provided in the monitor to correct or adjust these problems. The correction or adjustment is done with a plurality of user-accessible pushbuttons or knobs provided on an outside surface of the monitor. Such pushbuttons and knobs may have bad effect on the overall aesthetics of the monitor appearance. Further, it is sometimes difficult for a user to select the desired pushbutton or knob to do correct adjustment. An incorrect adjustment may eventually damage the eyes of a monitor user.

It is thus desirable to provide a monitor control to overcome the above drawbacks and provide an easy-to-use control for adjusting the display quality of the monitor.

SUMMARY OF THE INVENTION

It is therefore an object of the present invention to provide a monitor flywheel control which comprises a flywheel control to allow a user to easily adjust the display of a computer monitor.

It is another object of the present invention to provide a monitor flywheel control which comprises a flywheel knob to replace all of the pushbuttons and knobs conventionally used for adjusting the computer monitor so that an improved aesthetics of the monitor outside appearance can be achieved.

It is a further object of the present invention to provide a monitor flywheel control which uses a single flywheel control knob to perform all of the adjustment operations of the monitor display.

In accordance with the present invention, there is provided a monitor flywheel control which comprises a flywheel type bit generator to replace the conventional adjusting pushbuttons and knobs so that by means of a micro-controller technique, a single flywheel control knob can be used to perform all the desired adjustment of the computer monitor display.

These and other objects and advantages of the present invention will become more apparent from a consideration of the following detailed description of a preferred process thereof, when read in conjunction with the accompanying drawings, wherein:

DETAILED DESCRIPTION OF THE PREFERRED EMBODIMENT

Figure 1:
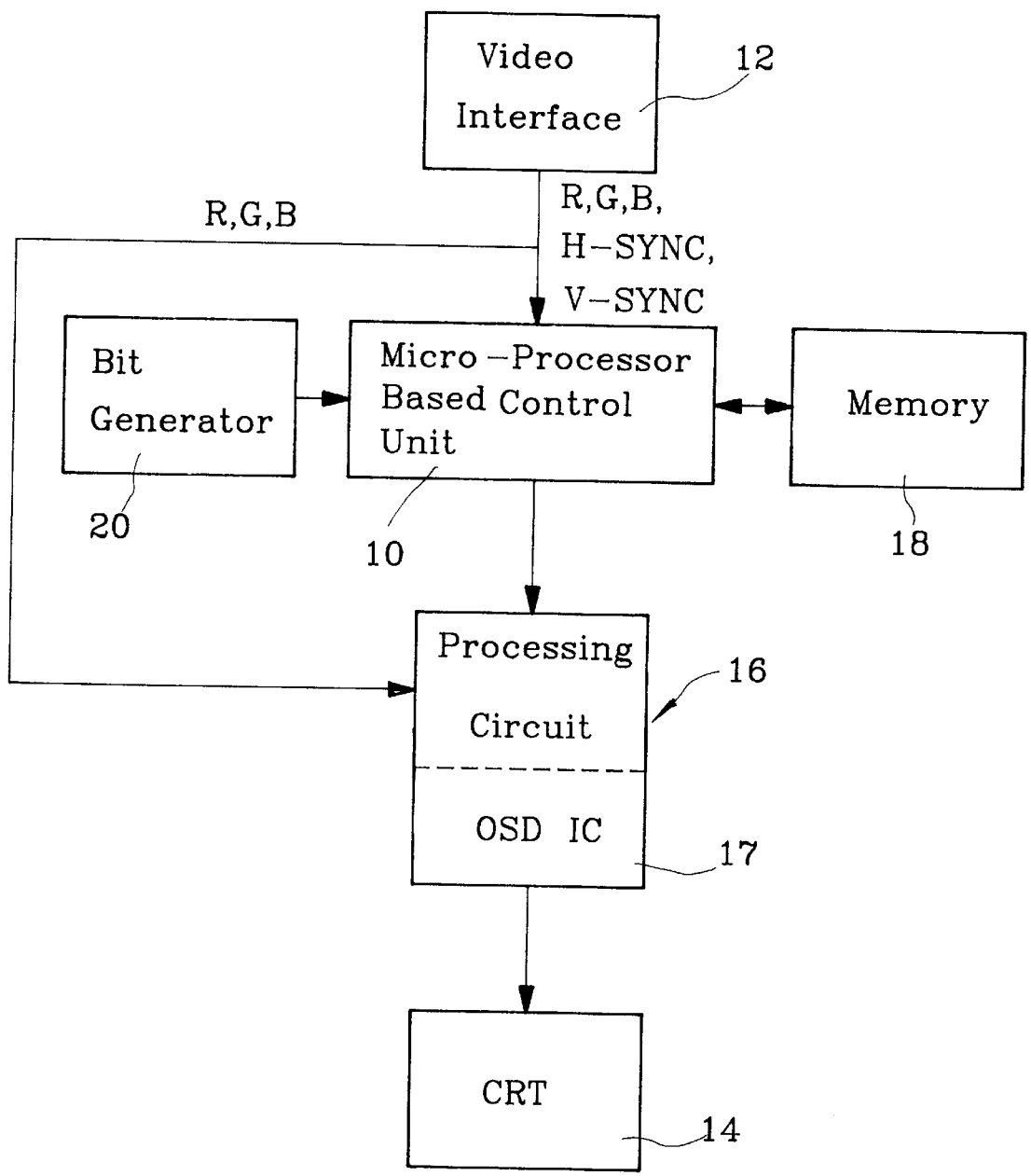
FIG. 1 is a block diagram of a monitor flywheel control in accordance with the present invention.

With reference to FIG. 1, in which a block diagram of a monitor display control circuit is illustrated, the control circuit comprises a micro-processor based controller unit 10 which may comprise a central processing unit. In a computer (not shown), such as a personal computer, a video interface 12, such as a VGA card, is provided to generate an image signal to be displayed on and to control a monitor (not shown) which comprises a cathode ray tube (CRT) 14. The image signal generated by the video interface 12 generally comprises the color signals of red (R), green (G) and blue (B) which are the elementary colors for composing any desired color on the monitor screen, a horizontal synchronization (H-SYNC) signal and a vertical synchronization (V-SYNC) signal. These signals are handled by the micro-processor based controller unit 10 and sent to the cathode ray tube 14 through a processing circuit 16 for display through the cathode ray tube 14.

Most of the color monitors that are currently available in the market are the so-called multi-sync color monitor which adapts micro-controller technique to control screen display parameters, such as video mode, resolution and display size. With the micro-controller technique, the screen display parameters are stored in a memory 18 and are displayable on the monitor screen and modifiable upon requested under the control of the controller unit 10. Thus, the memory 18 for the storage of the screen display parameters are preferably an electrical erasable programmable read only memory (EEPROM).

The micro-processor based controller unit 10 is to handle the screen display parameters by detecting the video mode indicated by the video interface 12 and comparing the video mode of the video interface 12 with the contents of the memory 18, the result of the comparison being an indication of the need of for adjustment of the cathode ray tube 14.

If the result of the comparison indicates that the display parameters stored in the memory 18 are inconsistent with those from the video interface 12, then an adjustment is needed. A bit generator 20 is provided as a user interface with the controller unit 10 for performing the adjustment.

In accordance with the present invention, a flywheel type bit generator is provided to serve as the user interface. The flywheel type bit generator 20 may have a circuit schematically illustrated in FIG. 2 and a mechanical structure schematically shown in FIG. 4 in an enlarged scale. A general form of the flywheel comprises a user-actuatable, rotatable knob which is allowed to rotate both clockwise and counterclockwise and is also depressible. The user-actuatable knob of the flywheel is not shown in the drawings. In accordance with the present invention, a flywheel is used to replace all the pushbuttons and knobs that are currently used on a monitor for adjustment of the display of the monitor.

Figure 4:
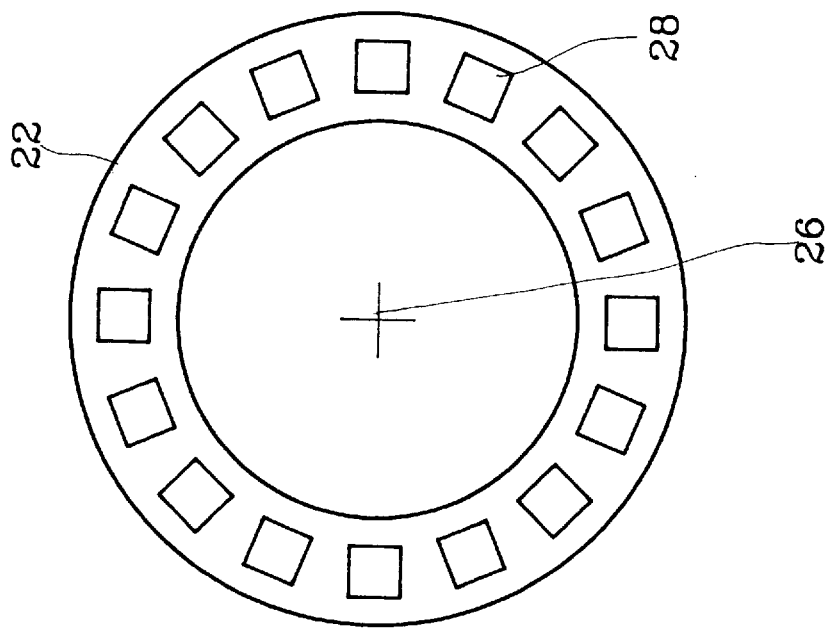
FIG. 4 shows the switch structure of the circuit of FIG. 2.
Figure 4:
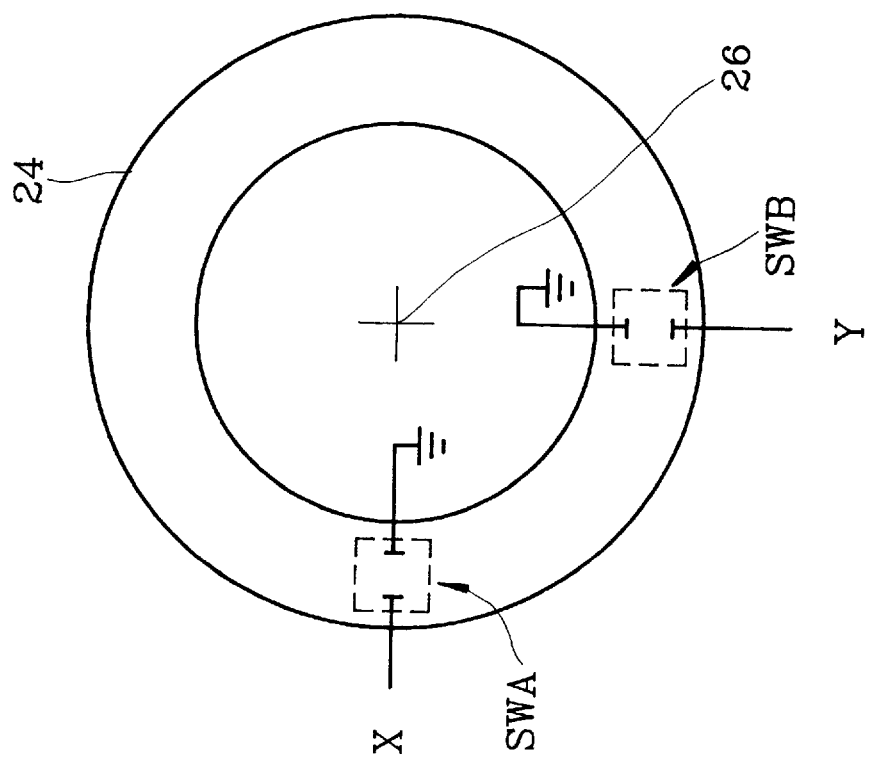

With particular reference to FIG. 4 wherein the mechanical structure of the flywheel is shown in a separated condition for clear illustration, the flywheel comprises a fixed disk 22 and a rotatable disk 24 which is concentrically overlapping the fixed disk 22 and rotatable relative to the fixed disk 22 about a common axis 26. The rotatable disk 24 is mechanically coupled to the user-actuatable knob of the flywheel to be rotatable in unison therewith so that a user may rotate the rotatable disk 24 relative to the fixed disk 22 through rotation of the user-actuatable knob.

Although in FIG. 4, the two disks 22 and 24 are not shown concentrically mounted on the same axis 26, yet it is imaginable that they in fact overlap each other in a concentric manner to allow the rotatable disk 24 to be rotatable about the axis 26 of the fixed disk 22.

Figure 3:
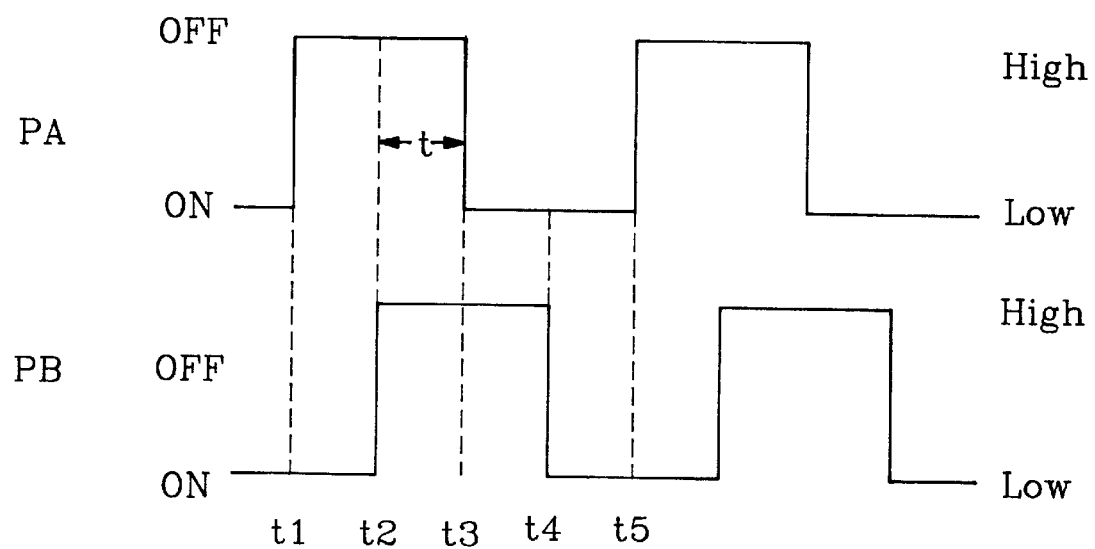
FIG. 3 is a timing diagram showing the pulse signals generated in the bit generator of FIG. 2.

The fixed disk 22 has a plurality of conductor pads 28 angularly equally-spaced disposed thereon along a circular trace with a center located on the axis 26. Corresponding to the conductor pads 28, the rotatable disk 24 has two switches SWA and SWB fixed thereon and angularly spaced from each other at a pre-determined angle along a circular trace of the rotatable disk 24 that corresponds the circular trace of the conductor pads 28 of the fixed disk 22. The overlapping relationship of the two disks 22 and 24 allows the switches SWA and SWB to sweep over the conductor pads 28 when the rotatable disk 24 is rotated relative to the fixed disk 22. Each time the switch SWA sweeps over one of the conductor pads 28, a pulse is generated. This also applies to switch SWB. Continuously rotating the rotatable disk 24 relative to the fixed disk 22 generates a series of pulses at each of the switches SWA and SWB. These pulses are illustrated in FIG. 3 as pulses PA and PB wherein pulses PA are associated with switch SWA and pulses PB associated with switch SWB.

In the embodiment illustrated, sweeping over the conductor pads 28 indicates a low level of the pulse generated thereby and a high level of the pulse is generated when the switch SWA or SWB is not located over the conductor pads 28 and instead between two adjacent conductor pads 28. It is also possible to reverse the low and high levels and this can be easily achieved by those having ordinary skills.

Figure 2:
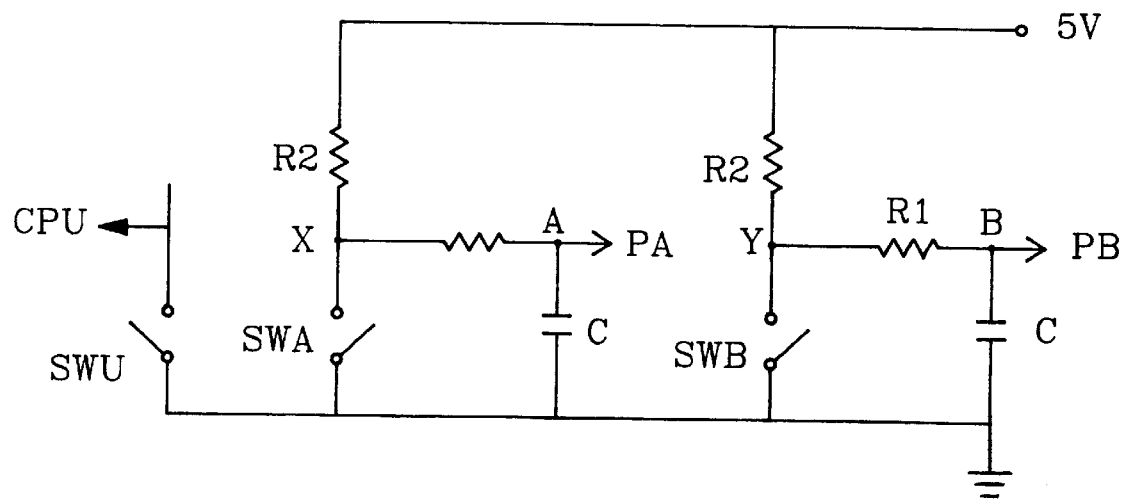
FIG. 2 is circuit diagram of the bit generator in accordance with the present invention.

Referring to FIG. 2, an exemplary circuit of the flywheel is illustrated. The circuit comprises two identical portions, each having a loop comprising a resistor R1 and a capacitor C connected in series with the respective switch SWA or SWB connected therebetween to form a loop. A power supply of a given voltage level, such as 5V is connected to input points X and Y of the two loops through a second resistor R2. The input points X and Y are connection points between the resistors R1 and the switches SWA and SWB. The loops provide output pulses PA and PB at output points A and B which are connection points between the resistor R1 and the capacitors C. The connection points between the switches SWA and SWB and the capacitors C are grounded. The grounding points and input points X and Y of the loops are also schematically illustrated in the mechanical structure shown in FIG. 4.

The circuit also comprises a switch SWU which when actuated signals the controller unit 10 of the beginning and ending of an adjustment so that by actuating the switch SWU and rotating the rotatable disk 24 relative to the fixed disk 22, two sets of pulses PA and PB are generated at output points A and B of the circuit and transmitted to the controller unit 10 to perform modification or adjustment of the screen display parameters stored in the memory 18.

Since the relative locations of the switches SWA and SWB are fixed, the rotation of the rotatable disk 24 over the fixed disk 22 generates two pulses that have a fixed HIGH/LOW status relative to each other. For example, the pulses PA and PB are fixed in their status relative to each other, namely, at point t1, PA changes from low to high and PB is low; at t2, PA remains high and PB is going from low to high; at t3, PA is lowering to low and PB remains high; at t4, PA remains low and PB is going down to low; and at t5 the status of the pulses PA and PB is back to that of t1. This sequence repeats and remains unchange no matter how fast the rotatable disk 24 is rotated. What is changed associated to increasing rotation speed of the rotatable disk 24 is the time interval between these points t1, t2, t3, . . . is reduced. When the rotatable disk 24 is rotatable in a reversed manner, namely the direction of rotation is reversed, the above sequence is also reversed. This provides an indication of the rotation direction of the rotatable disk 24. Further, the length of the time interval between any two successive ones of the above-discussed time points which is just a phase lag or lead between the two pulses PA and PB and is indicated by for example "t" in FIG. 3, provides an indication of the rotation speed of the rotatable knob or the rotatable disk 24. By this way, the controller unit 10 is capable to determine the direction and speed of the rotation of the user-actuatable knob.

In an actual operation, the user may depress the user-actuatable knob of the flywheel control to start the adjustment operation. The processing circuit 16 of the control circuit of the present invention may comprise an on-screen-display integrated circuit (OSD IC) 17 which displays icons of adjustment items on the monitor screen through the cathode ray tube 14. The user may then select the desired adjustment item through rotation of the user-actuatable knob of the flywheel to move a screen cursor to the icon of the desired item. The knob is then pushed again to complete the selection. This enters the screen for adjustment of the selected item. Rotating the knob again to adjust the selected item to a desired level and then pressing the knob to confirm the adjustment and exit the adjustment screen. The user may rotate the knob again to select next item to adjust or simply depress the knob to exit the icon screen and finish the adjustment operation.

It is quite apparent that with the flywheel control for adjusting the display of the monitor, the user may adjust the display status of the monitor with a single hand with the help of the icons displayed on the screen.

Those skilled in the art will readily recognize that modifications of the present invention may be made without departing from the scope of the present invention defined in the appended claims. The preferred embodiment illustrated and discussed herein should be understood to be exemplary only in nature and the scope of the instant invention is to be limited only by the following claims.

What is claimed is:

1. A flywheel control for use in a computer monitor having a user-actuatable rotatable and depressible knob, the monitor flywheel control comprising:

a micro-processor based controller unit in communication with a video interface of a computer for receiving image signals including a first set of display parameters from the video interface and processing and transmitting the image signals to a cathode ray tube through a processing circuit, re-writable memory means for storage of a second set of display parameters under the control of the controller unit, and a fly-wheel bit generator in communication with the controller unit for generating signals to the controller unit to adjust the second set of display parameters stored in the memory means, said bit generator controlled by the rotation of the user-actuatable knob to generate a first set of pulses and a second set of pulses having a phase difference therebetween transmitted to the controller unit so that the controller unit determines rotation direction of the knob with the phase difference between the first and second pulses and determines rotation speed of the knob based on a period of the pulses, the bit generator includes two electrical circuits with each having a resistor, a capacitor and a switch connected in series to define a loop, the loop having an input point between the resistor and the switch to which a power supply is connected through a second resistor and an output point between the resistor and the capacitor from which the pulses of the bit generator are supplied, and a third switch connected between the two loops and the controller unit.

2. The monitor flywheel control as claimed in claim 1, wherein the switches of the two loops are ON/OFF switches, respectively associated therewith, provided on a rotatable disk mechanically coupled to the user-actuatable knob to be rotatable in unison therewith, the two switches being angularly separated at a pre-determined angle along a circular trace of the rotatable disk and a fixed disk that concentrically overlaps the rotatable disk and has a plurality of conductor pads angularly and equally spaced along a circular trace on the fixed disk to correspond to the two switches so that the rotation of the rotatable disks relative to the fixed disk allows the switches to sweep over and in contact with the electrical pads and thus successively closing/opening the switches to generate the first and second pulses.

3. A flywheel control for use in a computer monitor having a user-actuatable rotatable and depressible knob, the monitor flywheel control comprising:

a micro-processor based controller unit in communication with a video interface of a computer for receiving image signals including a first set of display parameters from the video interface and processing and transmitting the image signals to a cathode ray tube through a processing circuit, re-writable memory means for storage of a second set of display parameters under the control of the controller unit, and a fly-wheel bit generator in communication with the controller unit for generating signals to the controller unit to adjust the second set of display parameters stored in the memory means, said bit generator controlled by the rotation of the user-actuatable knob to generate a first set of pulses and a second set of pulses having a phase difference therebetween transmitted to the controller unit so that the controller unit determines rotation direction of the knob with the phase difference between the first and second pulses and determines rotation speed of the knob based on a period of the pulses, the bit generator includes two electrical circuits with each having a resistor, a capacitor and a switch connected in series to define a loop, the loop having an input point between the resistor and the switch to which a power supply is connected and an output point between the resistor and the capacitor from which the pulses of the bit generator are supplied, and a third switch connected between the two loops and the controller unit.

4. The monitor flywheel control as claimed in claim 3, wherein the switches of the two loops are ON/OFF switches, respectively associated therewith, provided on a rotatable disk that is mechanically coupled to the user-actuatable knob to be rotatable in unison therewith, the two switches being angularly separated at a pre-determined angle along a circular trace of the rotatable disk and a fixed disk that concentrically overlaps the rotatable disk and has a plurality of conductor pads angularly and equally spaced along a circular trace on the fixed disk to correspond to the two switches so that the rotation of the rotatable disks relative to the fixed disk allows the switches to sweep over and in contact with the electrical pads and thus successively closing/opening the switches to generate the first and second pulses.

\* \* \* \* \*